(12) United States Patent
Brown

(10) Patent No.: US 7,043,669 B2
(45) Date of Patent: May 9, 2006

(54) SIMPLE SCENARIO BUILDER

(75) Inventor: Jerry Richard Brown, Wallkill, NY (US)

(73) Assignee: International Business Machines Corporation, Armonk, NY (US)

(*) Notice: Subject to any disclaimer, the term of this patent is extended or adjusted under 35 U.S.C. 154(b) by 587 days.

(21) Appl. No.: 10/115,517

(22) Filed: Apr. 3, 2002

(65) Prior Publication Data
US 2003/0191987 A1 Oct. 9, 2003

(51) Int. Cl.
*G06F 11/00* (2006.01)

(52) U.S. Cl. .......................... 714/45; 714/46

(58) Field of Classification Search .............. 714/45, 714/46
See application file for complete search history.

(56) References Cited

U.S. PATENT DOCUMENTS

| | | | |
|---|---|---|---|
| 5,086,393 A * | 2/1992 | Kerr et al. ................ | 702/186 |
| 5,168,554 A | 12/1992 | Luke ......................... | 395/161 |
| 5,233,611 A * | 8/1993 | Triantafyllos et al. ........ | 714/46 |
| 5,321,838 A * | 6/1994 | Hensley et al. ............. | 717/125 |
| 5,386,581 A | 1/1995 | Suzuki et al. ............... | 395/800 |
| 5,442,740 A | 8/1995 | Parikh ........................ | 395/140 |
| 5,649,085 A | 7/1997 | Lehr .......................... | 395/140 |
| 5,710,901 A | 1/1998 | Stodghill et al. ............ | 395/339 |
| 5,745,686 A | 4/1998 | Saito et al. ............ | 395/200.15 |
| 5,793,948 A * | 8/1998 | Asahi et al. ................. | 714/47 |
| 5,953,010 A | 9/1999 | Kampe et al. .............. | 345/348 |
| 6,016,558 A | 1/2000 | Seong et al. ................ | 714/45 |
| 6,057,839 A * | 5/2000 | Advani et al. .............. | 715/784 |
| 6,662,226 B1 * | 12/2003 | Wang et al. ................ | 709/224 |
| 6,698,013 B1 * | 2/2004 | Bertero et al. .............. | 717/127 |

* cited by examiner

Primary Examiner—Scott Baderman
Assistant Examiner—Gabriel L. Chu
(74) Attorney, Agent, or Firm—Akerman Senterfitt

(57) ABSTRACT

A method of constructing a diagnostic scenario can include intercepting at least one user input event, capturing an image of a region surrounding the user input event, and generating a diagnostic frame specifying the image and text representing attributes of the intercepted user input event.

29 Claims, 4 Drawing Sheets

SIMPLE SCENARIO BUILDER

BACKGROUND OF THE INVENTION

1. Technical Field

The invention relates to the field of software diagnostics, and more particularly, to recording application related and user interaction information for diagnosing application problems.

2. Description of the Related Art

Problems encountered when using an application go unreported in many cases. This lack of reporting occurs largely due to the burden placed on the user to collect adequate information for diagnosing an application fault or failure. As is often the case, the user is presented with a message indicating that an application fault has occurred. It then becomes incumbent upon the user to make note of the pertinent information in the fault message so that the data is not lost.

In cases where application faults are reported, however, developers may be unable to accurately diagnose the problem due to the scarcity of information which is actually collected by the user. For example, although the user may collect information provided in an application fault message, frequently this information is limited to information specific to the internal workings of the application, such as the location in memory where the fault occurred and the values of particular processor registers. The fault message information provides little, if any, insight as to how the application entered the operating state in which the failure occurred. Moreover, such information fails to provide any insight as to the series of application-user interactions leading up to the application fault.

Some varieties of software utilities do provide more comprehensive information relating to the operational state of an application prior to the application's failure. For example, tracing utilities provide insight regarding the inner-workings of an application program by enabling developers to trace the operation of a program through the moments leading up to an application fault. Because most tracing utilities operate on a micro-level, or in other words, the utilities focus only on the inner workings of an application, these conventional tracing utilities also are unable to portray higher level interactions between a user and the application.

SUMMARY OF THE INVENTION

The invention disclosed herein provides a solution for diagnosing application problems such as performance related issues, application faults, failures, and other problematic behavior. In particular, the present invention provides a high level solution for diagnosing application faults by recording user interactions with an application and the application's various graphical user interfaces, as well as recording other application information to produce a record of events and application information prior to a fault. Once activated, the present invention can record visual image diagnostic information representing the screen display. Additional textual diagnostic information relating to the application and user interactions with the application can be included and/or associated with the visual image diagnostic information to provide a more comprehensive representation of developing problems. Diagnostic information can be collected until an application fails or until a diagnostic session is terminated. The resulting diagnostic information can provide a comprehensive view of the inner-workings and external events leading up to a particular application fault.

One aspect of the present invention can include a method of constructing a diagnostic scenario. The method can include intercepting at least one user input event, capturing an image of a region surrounding the user input event, and generating a diagnostic frame specifying the image, and text representing attributes of the intercepted user input event. The intercepting, capturing, and generating steps can be repeated for subsequent user input events to build a plurality of diagnostic frames. The diagnostic frames can be stored in a data repository wherein subsequent ones of the diagnostic frames can overwrite earlier ones of the diagnostic frames. The plurality of diagnostic frames can represent recent user interactions with an application, which then can be used to diagnose a fault of the application program. Notably, the intercepting, capturing, and generating steps can be responsive to the detection of an application fault. After processing user input events, the intercepted events can be provided to an intended application.

If the intercepted user event is a pointer event, a location of the pointer event can be identified and a representation of the location of the pointer event can be included in the captured image. One or more display objects, for example windows, menu items, or activatable icons, in contact with the region, or over which the pointer event occurred, can be detected and attributes of the display objects can be identified. The type of the display object can be identified and a data collection technique can be implemented according to the identified display object type. The display object attributes can include, but are not limited to, a name of a display object, a name of a parent of a display object, a coordinate of the location of the pointer event, and a message of the display object. Text representing the display object attributes can be included in the diagnostic frame. The method also can include intercepting keystroke events and including text representing the keystroke events in the diagnostic frame.

Another aspect of the present invention can include an application diagnostic tool. The application diagnostic tool can include a user event interface configured to intercept user initiated events and an image processor configured to generate an image of a display. The image can encompass a predetermined display region. Additionally, the diagnostic tool can include a data processor configured to determine textual information relating to the user initiated events and objects in contact with the display region. An application interface for distributing the user initiated events to intended applications and a data repository also can be included. The data repository can be configured to store the image and the textual information. Within the data repository, the image can be associated with the textual information.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution for diagnosing application problems such as performance related issues, application failures, faults, errors, and other problematic application behavior (hereafter collectively referred to as faults). In particular, the present invention can collect information relating to both user interactions with an application as well as other information relating to the application itself. The resulting diagnostic information can be provided as a series of sequential frames including both images and textual information. When viewed, the frames can represent a scenario portraying both user actions and the inner-workings of an application in the time leading up to an application fault.

Figure 1:
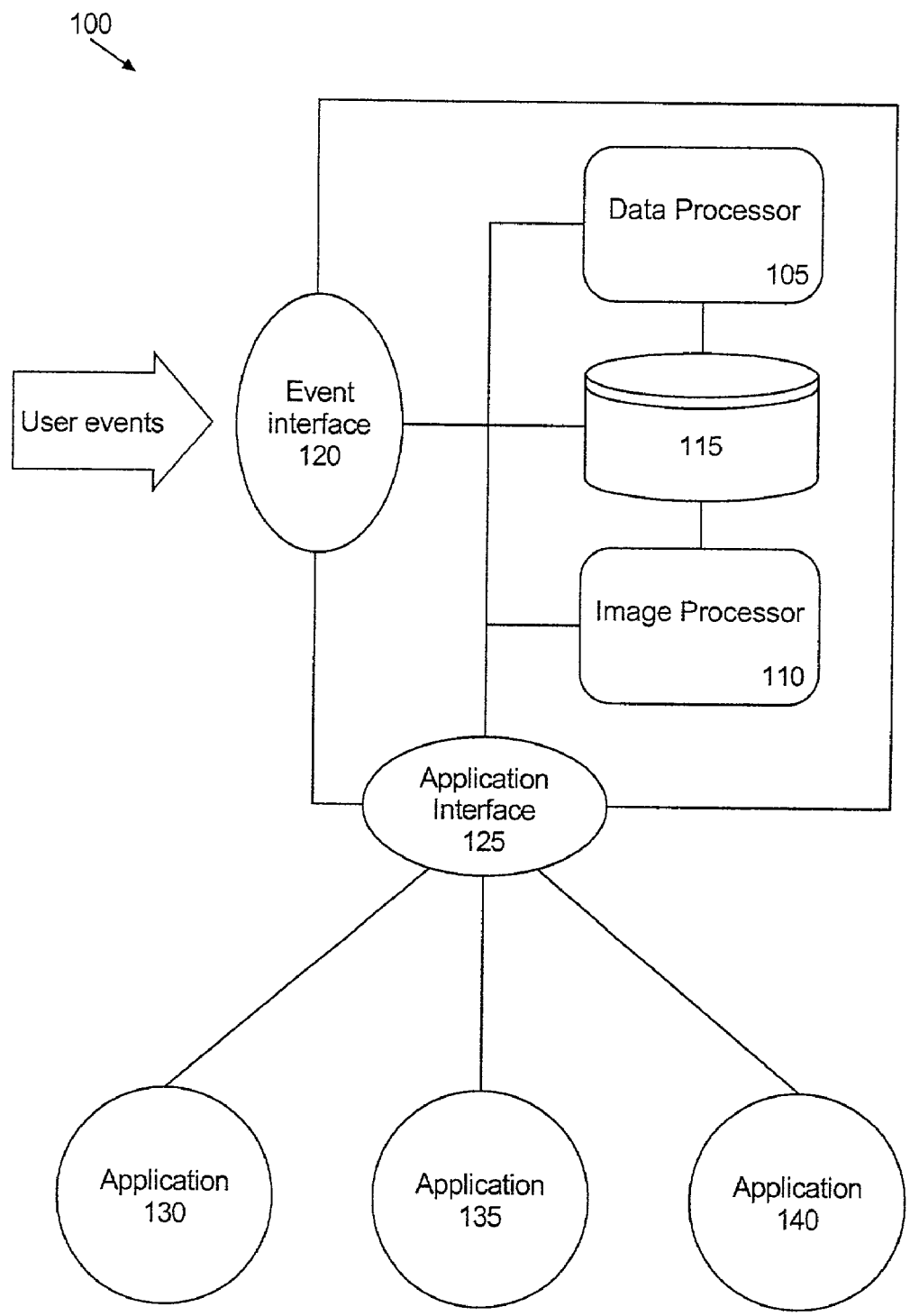
FIG. 1 is a schematic diagram illustrating a diagnostic utility in accordance with the inventive arrangements disclosed herein.

FIG. 1 is a schematic diagram illustrating a diagnostic utility 100 in accordance with the inventive arrangements disclosed herein. The diagnostic utility 100 can intercept various events, for example any user interaction with a monitored application, record diagnostic information responsive to the received events, and then forward the intercepted events to an appropriate application such as application 130, 135, or 140. As shown in FIG. 1, the diagnostic utility can include a data processor 105, an image processor 110, as well as a data repository 115. The data processor 105 and image processor 110 can collect various forms of diagnostic information and store, as well as retrieve, that information within the data repository 115. An event interface 120 and an application interface 125 also can be included within the diagnostic utility 100.

The event interface 120 can be configured to intercept events for generally controlling a computer system, for example events directed to an operating system to launch an application, as well as events which directed to an active application. The events can be derived from any user initiated input from any of a variety of input devices. For instance, the events can include keystrokes, pointer manipulations such as pointer movements and pointer selections, or any other event triggered from a keyboard, mouse, microphone, or other input device. After processing received events, the events can be provided to the application interface 125. As shown, the application interface 125 can provide the events to one of the applications 130, 135, or 140 to which the event was intended.

The data processor 105 can receive the events and generate textual diagnostic information relating to attributes of the received events and attributes of selected display objects. For example, in the case of a pointer event, the event attributes can include a coordinate specifying the location of a pointer or whether a selection has been made with the pointing device. In the case of a keystroke event, the event attributes can include which keys are being activated. The data processor 105 further can determine the application, if any, to which the received event was directed. For example, an active window of a display can be identified as the application to which the received event is to be provided.

The data processor 105 can define a region surrounding the location of the pointer and determine the attributes of any display objects in contact with the defined region. Notably, the defined region can include an entire display or any portion thereof. The display objects can include, but are not limited to, activatable icons, windows, menus, status text to be displayed, and the like. Thus, attributes such as an object name, a parent object name, for example a name of a parent window to another window, as well as the operating status of a display object can be determined from the display objects. The operating status of a display object can vary according to the object type. For example, windows can be active or inactive, buttons can be up or down, etc. Those skilled in the art will recognize that the object attributes can be determined through a standard application programming interface (API), for example using functions such as "GETWINDOW", "GETWINDOWTEXT", and the like.

The image processor 110 can capture an image of the display. The image can be a representation of the entire display or any portion thereof. For example, the image processor 110 can capture an image of the defined region. The image processor can include a representation of the location of a pointer within the image. The location of the pointer can be identified from an intercepted event identified by the data processor 105.

Image diagnostic information generated by the image processor 110, as well as textual diagnostic information collected by the data processor 105 can be stored within the data repository 115. The textual diagnostic information collected by the data processor 105 can be associated with particular image diagnostic information. The combination of image and textual diagnostic information can be referred to as a frame. In one embodiment of the present invention, the textual diagnostic information can be included and stored as part of an associated image.

The diagnostic utility 100 can be activated by a user in cases where an application is not performing properly or where the user is fearful that an application fault may occur. In another embodiment of the present invention, the diagnostic utility 100 can be activated automatically upon detection of a fault or upon detecting that an application is not performing efficiently. In another embodiment of the present invention, diagnostic information can be continuously recorded, for example in looping fashion, wherein older data is continuously overwritten with newer diagnostic data. Accordingly, diagnostic information can be collected continuously regardless of being activated or a fault occurring. The resulting data would provide a representation of the most recent user interactions with an application program.

Figure 2:
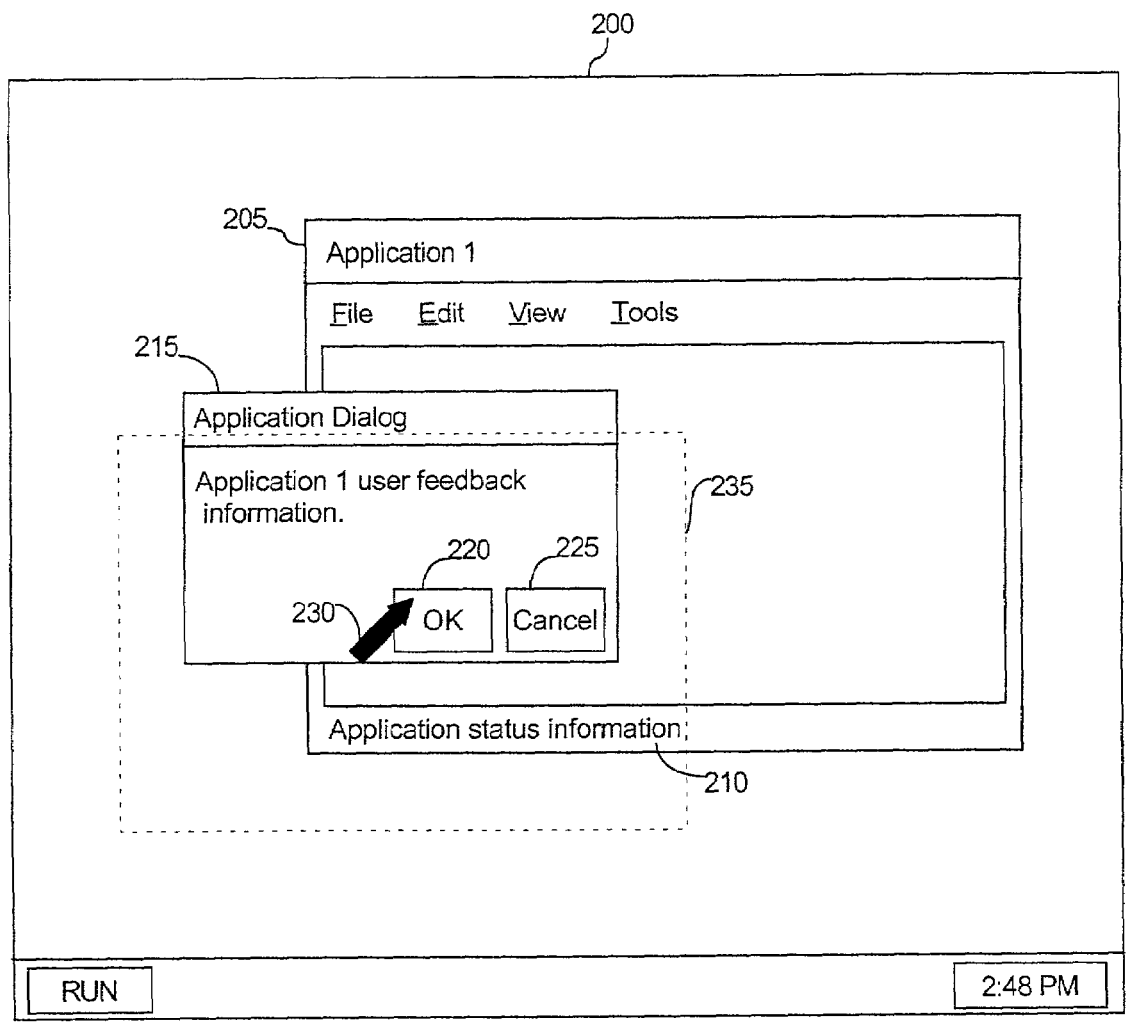
FIG. 2 is a view of an exemplary display illustrating the collection of diagnostic information using the diagnostic utility of FIG. 1.

FIG. 2 is a view of an exemplary display 200 wherein diagnostic information is recorded using the diagnostic utility of FIG. 1. As shown in FIG. 2, an event such as a pointer selection event can initiate the collection diagnostic information. Responsive to detecting an event generated by pointer 230, a coordinate specifying the location of the pointer 230 can be determined. Accordingly, a region 235 surrounding the pointer 230 can be defined. The size of the region 235 can be predetermined and user configurable to accommodate different user preferences as well as different uses of the diagnostic utility.

The diagnostic utility can identify any display object in contact with the defined region 235. For example, objects such as activatable icons 220 and 225 can be identified. The active window, in this case window 215 can be identified as well as the parent window 205 of window 215. Status bar information 210 from window 205 also can be identified. In addition to the names of each respective object in contact with region 235, the operating state of each object also can be determined. For example, information such as whether windows in contact with the region are active, which objects are in contact with the pointer 230, whether an activatable icon has been activated, is up or down, as well as the name of the application or window to which particular icons or menu selections are associated.

Although not depicted in FIG. 2, keystrokes also can be collected and stored. In one embodiment of the invention, particular events such as pointer selections, menu selections, or other more important or designated events can serve as indicators for beginning a new frame of diagnostic information. Accordingly, upon receiving such an event, an image can be captured along with textual diagnostic information as described above. Keystrokes also can be stored and associated with the current frame until another event is received which indicates that a new frame should be started.

Figure 3:
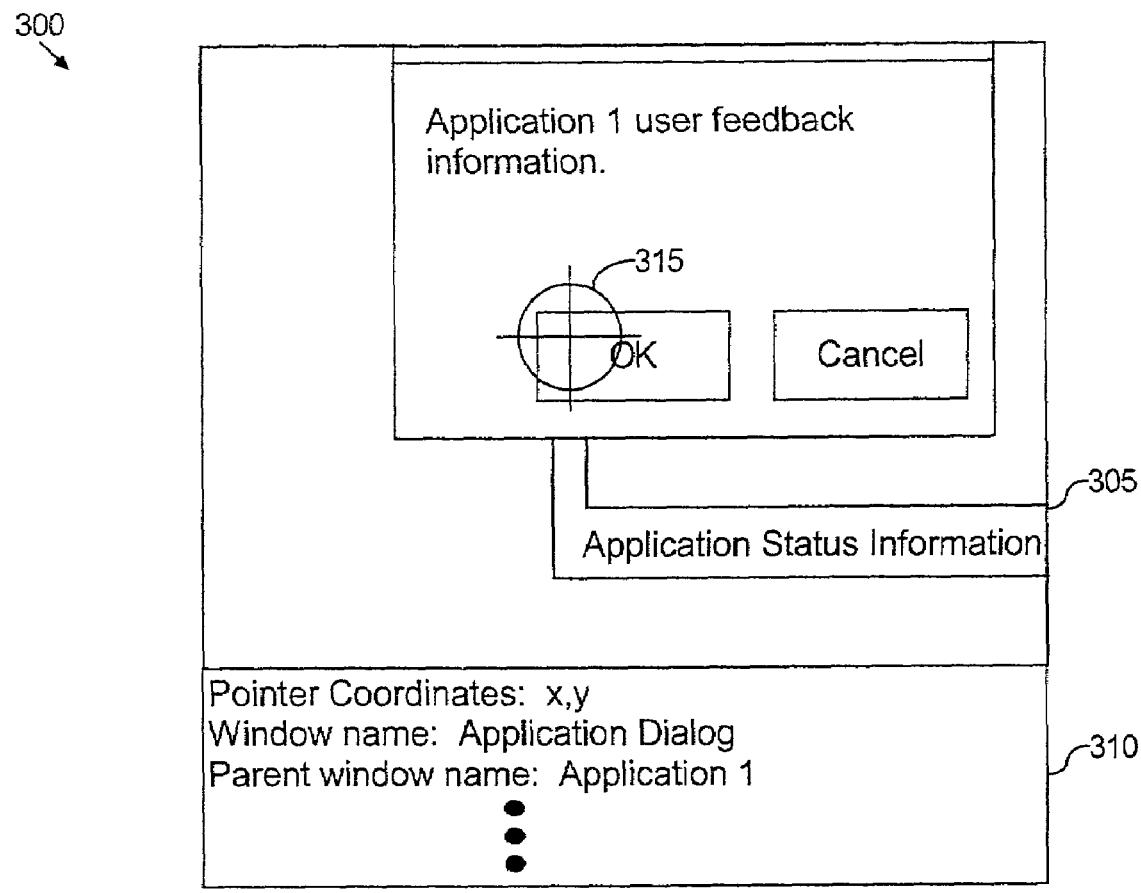
FIG. 3 is a schematic diagram illustrating one embodiment of a frame specifying diagnostic information.

FIG. 3 is a schematic diagram illustrating a frame 300 of diagnostic information. As shown in FIG. 3, frame 300 can include two sections, an image section 305 and a textual data section 310. The image section 305 can include diagnostic information specified as an image of the defined region 135 of FIG. 2. Still, as mentioned, the image can be a representation of the entire display and need not represent only a portion of the display. The image section 305 can include an identifier 315 which indicates the relative location of the pointer or cursor within the image at the time the image was generated.

The textual data section 310 of frame 300 can include diagnostic information specified in text form. The textual diagnostic information, as previously mentioned, can include information such as a name or description of each object in the image, the coordinates of the cursor or pointer, the status of each object, keystrokes, and any other parameter information relating to a display object represented in the image section 305. Time and date information describing when the image was generated and when each piece of information was collected also can be included.

The frame 300 shown in FIG. 3 is provided for purposes of illustration and is not intended as a limitation on the present invention. For example, the image diagnostic information and associated textual diagnostic information can be stored as separate components in a data repository or database. Such an embodiment would enable sequential viewing of image diagnostic information as well as query access to the textual diagnostic information. Alternatively, the textual diagnostic information can be incorporated within the image. For example, the textual diagnostic information can be included at the base of the image as shown, as header information, as an over-lay of the image, or at some other portion of the image.

The textual information further can be presented in a variety of different formats. For instance, the textual information can be listed as shown in FIG. 3. Alternatively, the textual information can be displayed as a series of user actions. In that case, for example, an event can be specified as "Mar. 20, 2001 at 3:20 p.m., click OK button in Application Dialog window of Application 1 (LBD)." This reflects the relevant object parameters such as the text of the icon that was selected, the window and application to which the icon belongs, as well as the manner in which the icon was selected, that is left button down or "LBD".

The diagnostic utility can capture information using a variety of other techniques. According to one aspect, attributes of visible components can be determined using an object hierarchy technique. For example, an object, such as a button or text input field, is a component within a container or set of containers. Retrieval and reporting of the visible containers, such as frames, tabs, and windows, to which an object subject to a mouse or keyboard interaction belongs, can be performed. For instance, a window can contain a tab container, and on a given tab, there can be several frames. The user can click an "Add" button within one of the frames. Although a button with the caption "Add" may exist in all of the frames within the tab, each button can perform a different task. To precisely identify the particular "Add" button selected, the diagnostic utility can determine the family tree of the object with which the user has interacted. For example, the following information can be determined from a recipe application graphical user interface:

Tab=Flavors

Frames=Bitter, Sweet, Neutral

Buttons=Button labeled "Add" in each of frames "Bitter", "Sweet", and "Neutral" of the tab "Flavors".

Accordingly, the diagnostic tool can determine a description of the button which was clicked as "'Add' in 'Sweet' frame on 'Flavors' tab" and an object hierarchy of "'Add' button/ 'Sweet' frame/'Flavors' tab".

According to another aspect of the present invention, objects such as text input fields, which may have a visual identity presented by an adjoining label, can be identified through a label capture technique. If such an object is the subject of a user interaction, the object can be precisely identified by realizing that the object does require additional identification by virtue the existence of an adjoining label object. A scan of all objects within the parent container or related containers can be performed. The scan can identify objects within the same container or related containers which posses the object type of "label" or other similar visually identifying object. Each of the identified objects can be subjected to a qualification routine which determines the "best fit" label or similar visually identifying object. The "best fit" object can be one that possesses top and left coordinates which are suitably related to the object with which the user is interacting within the same container.

In another aspect of the invention, remote object data which is pertinent to an event can be captured. Remote object data may be distinctly separate from the object with which the user is interacting, at least from a hierarchical perspective, while being visually apparent to an end user and immediately associated with an event. For example, in the case of a drawing program, a user can define an ellipse using three (3) interactions. The user can specify the center point of the ellipse, the first radius, and the second radius of the ellipse. The first interaction can be a simple (X,Y) coordinate. A user can specify this coordinate by a pointer selection or through a data field. If entered in a data field, the field is disassociated from the object. That is, the field is not in the family tree of the object with which the user is interacting (the drawing area), but is visually apparent, for example in a floating toolbar. When such an event occurs, the diagnostic utility can recognize this type of event and identify the distinctly separate, but visually and programmatically associated object. The data within the object can be captured after the click occurs, but before the click is passed to the program for which the diagnostic utility is collecting data.

Still, data which is pertinent to an event and which is contained in the window including the object with which a user is interacting, also can be collected. In particular, different data collection techniques can be implemented according to the "type" value associated with a selected object. Objects possess a "type" value which, when evaluated, can be used to trigger appropriate routines. In illustration, when a message window is presented where the user interacts with the window by clicking a button on the window, such as an "OK" button, the window type can be identified to determine which data collection technique or routine is to be implemented. If the parent window type identifies the window as a message window, for example, a routine can be exercised which identifies a label (static object) within the window. The routine can capture the label data which is visually displayed. The label data can be included within the diagnostic frame. Thus, a description of message text such as "message=bad file name" can be included in the diagnostic frame.

Figure 4:
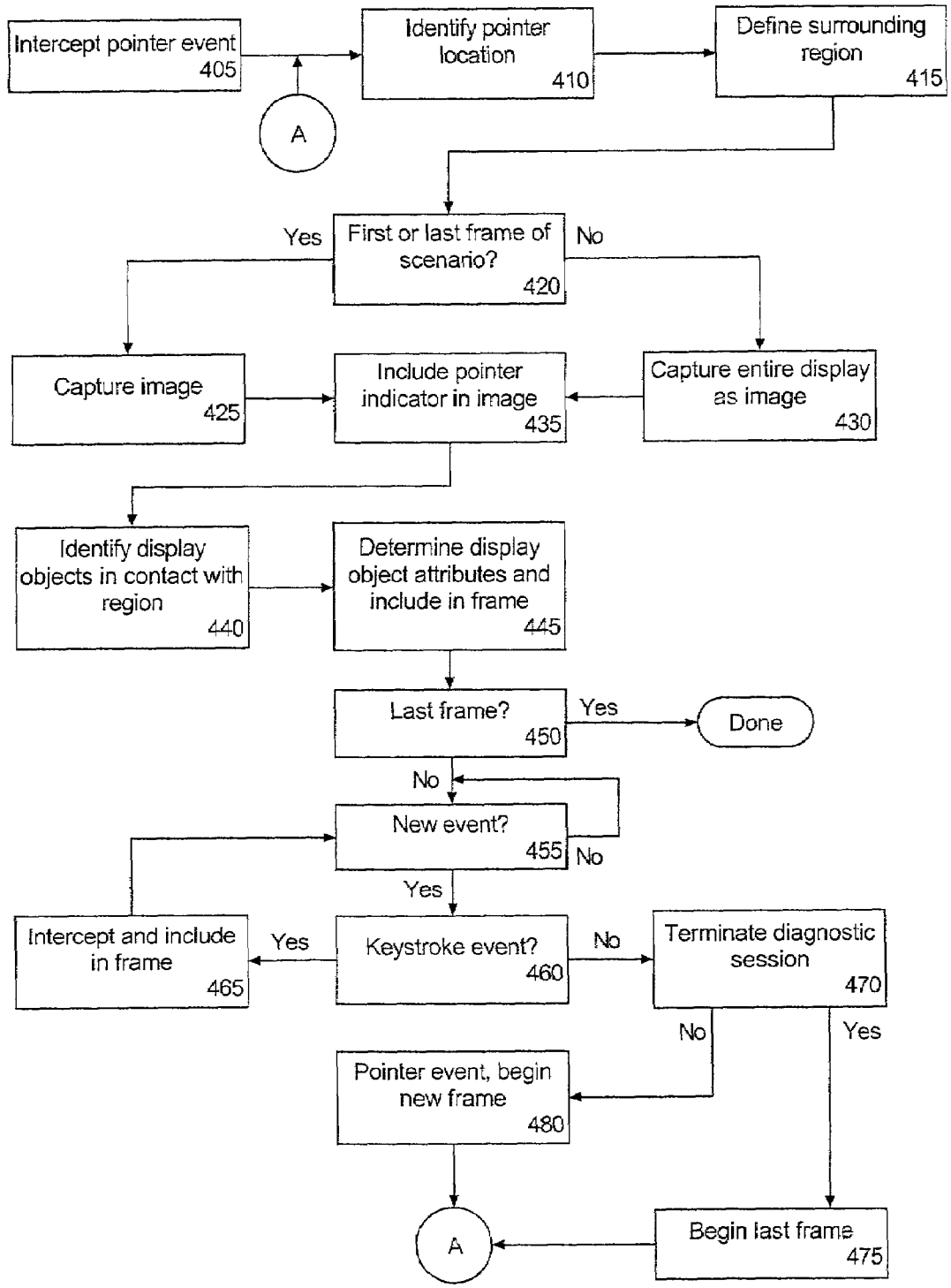
FIG. 4 is a flow chart illustrating a method of collecting diagnostic information in accordance with the inventive arrangements disclosed herein.

FIG. 4 is a flow chart illustrating a method of collecting diagnostic information in accordance with the inventive arrangements disclosed herein. The method can begin in a state where the diagnostic utility has been activated responsive to a user request or a system detected condition. Accordingly, in step 405, a pointer event can be intercepted. If the pointer event is an indicator that a new frame is to be started, then responsive to the pointer event, a new frame for storing image and textual diagnostic information can be created. In step 410, the location of the pointer can be determined from the received event. In particular a coordinate specifying the on-screen pointer location can be determined. In step 415, a surrounding region can be defined. The surrounding region can be set to a default size and shape, but also can be configured to suit particular diagnostic needs.

In step 420, a determination can be made as to whether the current frame is either a first or a last frame of a diagnostic session. If the frame is a first or last frame, the method can proceed to step 430 where an image of the entire display can be generated. If the current frame is not a first or last frame, the method can proceed to step 425 where an image of the defined region can be generated. After generating an image, whether in step 425 or in step 430, the method can continue to step 435.

In step 435, an identifier indicating the location of the pointer can be included within the generated image. For example, the identifier can be any of a variety of graphic symbols and can be placed in the image at a location which is representative of the actual location of the pointer on the display at the time the image was generated. The location of the indicator within the image can be determined based upon the detected location of the actual pointer as determined from the pointer event in step 410. After completion of step 435, the method can continue to step 440.

In step 440, any display objects included within the defined region or in contact with the defined region can be identified. Thus, activatable icons, windows, menus, and the like which are in contact with the defined region can be identified. In step 445, the attributes of the display objects can be determined. As mentioned, the attributes can include any defined attribute of a display object such as the object name, possible actions of the display object, whether the display object is active, the operational state of the display object, a parent object to which the display object is associated or belongs, and any text parameters or messages included in the display object.

Notably, because the defined region can move to different portions of a display depending upon the detected pointer event, and the diagnostic utility can detect objects within the region, which objects were selected, the application to which the object belongs, and any active applications, the collected diagnostic information can represent user interactions with more than one application.

In step 450, a determination can be made as to whether the current frame is a last frame. If so, the method can end. If not, however, the method can continue to step 455, where a new event can be detected. If no event is detected, the method can continue to loop until such time when an event is detected. Proceeding to step 460, a determination can be made as to whether the new event is a keystroke. If so, the method can continue to step 465 where the keystroke can be intercepted and associated with the current frame. The method can continue to step 455 to continue detecting additional events.

If the new event was not a keystroke, the method can continue to step 470 where a determination can be made as to whether the received event is an indicator to end the current diagnostic session. For example, the event can be a user request to end the diagnostic session or can be system initiated event indicating that an application has failed. Regardless, if the event is an indicator to terminate the current diagnostic session, the method can continue to step 475 to begin a last frame of the current diagnostic session or scenario. The method can continue to jump circle A to generate a last frame and eventually end.

If the event was not an indicator to terminate the current diagnostic session, the method can continue to step 480. In step 480, the event can be identified as a pointer event. Accordingly, a new frame can be started for storing additional image and textual diagnostic information as part of the current diagnostic session. The method then can proceed to jump circle A to continue recording diagnostic information as part of the new frame.

The invention combines multiple methods of scenario creation into a single tool. The user need only start the tool, interact with a failing application in an unencumbered manner until the failure occurs, and then terminate the recording session. The resulting frames of diagnostic information, whether specified as images with text data being included as part of the image, or specified as separate but associated text and image components, provide a step by step description of an end user's interaction with the failing application. The frames can be stored in any of a variety of formats. In one embodiment, frames can be stored as a video, for example as an audio video interleaved (AVI) file, wherein frames can be sequentially displayed. Frames also can be formatted for display on a Web site using hypertext markup language. Regardless of the format of the frames, upon termination of a diagnostic session, the user has the opportunity to annotate any of the individual frames. For example, users can edit the textual diagnostic information and annotate the image diagnostic information on a frame by frame basis thereby allowing users to add commentary or place emphasis on particular portions of the textual and/or image diagnostic information. The user edits to each frame can be saved for future reference.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of constructing a diagnostic scenario from user interactions comprising:
    within a graphical computing environment configured to permit users to interact with applications via a plurality of windows, receiving user input from an input device;
    responsive to said received user input, the graphical computing environment initiating at least one user input event intended to be received by at least one component of the graphical computing environment, wherein the at least one component executes at least one programmatic action responsive to receiving the at least one user event;
    (a) intercepting said at least one user input event;
    (b) processing said at least one user input event prior to execution of said at least one programmatic action, said processing being based at least in part on said at least one user input event;
    (c) generating and recording diagnostic information based on the at least one user input event in response to interception of said at least one user input event;
    (d) forwarding said at least one user input event to an intended application;
    (e) capturing an image of a region surrounding said at least one user input event; and
    (f) generating a diagnostic frame comprising said image, and text representing attributes of said at least one user input event.

2. The method of claim 1, further comprising: repeating said steps (a)–(f) for subsequent ones of said user input events to build a plurality of diagnostic frames.

3. The method of claim 2, further comprising:
    diagnosing an application fault according to said plurality of diagnostic frames.

4. The method of claim 2, wherein said steps (a)–(f) are responsive to detecting an application fault.

5. The method of claim 2, further comprising:
    storing said plurality of diagnostic frames in a data repository, wherein subsequent ones of said diagnostic frames overwrite earlier ones of said diagnostic frames, said plurality of diagnostic frames representing recent user interactions with an application.

6. The method of claim 1, further comprising:
    selecting one of a plurality of intended application and forwarding said at least one user input event to the selected intended application.

7. The method of claim 1, wherein said at least one user event comprises a plurality of user events including a pointer event, said method further comprising:
    identifying a location of said pointer event; and
    including a representation of said location of said pointer event in said captured image.

8. The method of claim 7, further comprising:
    detecting at least one display object in contact with said region;
    identifying attributes of said display object; and
    including text representing said display object attributes in said diagnostic frame.

9. The method of claim 8, further comprising:
    identifying a type of said display object; and
    implementing a data collection technique according to said identified display object type.

10. The method of claim 1, further comprising:
    intercepting keystroke events; and
    including text representing said keystroke events in said diagnostic frame.

11. A method of constructing a diagnostic scenario comprising:
    intercepting a pointer event;
    processing said pointer event prior to execution of at least one programmatic action by an intended application in response to said pointer event, said processing being based at least in part on said pointer event;
    generating and recording diagnostic information based on the processing of said pointer event;
    forwarding said pointer event to said intended application;
    identifying a location of said pointer event;
    capturing an image of a region surrounding said pointer event that includes a representation of said location;
    detecting at least one display object in contact with said region; identifying attributes of said display object; and
    generating a diagnostic frame comprising said image, and text representing attributes of said pointer event, wherein said attributes include identified attributes of said display object, and wherein said attributes are selected from the group consisting of a name of said display object, a name of a parent of said display object, a coordinate of said location of said pointer event, and a message of said display object.

12. The method of claim 11, wherein said pointer event occurs over said display object.

13. The method of claim 11, wherein said display object is a window.

14. An application diagnostic tool comprising:
    a user event interface configured to intercept at least one user-initiated event comprising information for controlling a computer system, said information including information corresponding to a computer-implemented application and operating system information for launching the computer-implemented application;
    an image processor for processing said at least one user-initiated event and being configured to generate and record diagnostic information in response to said at least one user-initiated event and to generate an image of a display, said image encompassing a predetermined display region;
    a data processor for processing said at least one user-initiated event and being configured to generate and record diagnostic information in response to said at least one user-initiated event and to determine textual information relating to said at least one user-initiated event and display objects in contact with said display region; and
    an application interface for distributing said at least one user-initiated event to intended applications after said at least one user-initiated event has been processed by at least one of said image processor and said data processor, wherein said user event interface, image processor, data processor, and application interface are components of a graphical computing environment configured to permit users to interact with the intended applications via a plurality of windows, wherein the intended applications are configured to execute at least one programmatic action responsive to receiving the at least one user-initiated event distributed by the application interface.

15. The diagnostic tool of claim 14, further comprising:
a data repository configured to store said image and said textual information, wherein said image is associated with said textual information.

16. A machine-readable storage, having stored thereon a computer program having a plurality of code sections executable by a machine for causing the machine to perform the steps of:
within a graphical computing environment configured to permit users to interact with applications via a plurality of windows, receiving user input from an input device;
responsive to said received user input, the graphical computing environment initiating at least one user input event intended to be received by at least one component of the graphical computing environment, wherein the at least one component executes at least one programmatic action responsive to receiving the at least one user event;
(a) intercepting said at least one user input event;
(b) processing said at least one user input event prior to execution of said at least one programmatic action, said processing being based at least in part on said at least one user input event;
(c) generating and recording diagnostic information based on the at least one user input event in response to interception of said at least one user input event;
(d) forwarding said at least one user input event to an intended application;
(e) capturing an image of a region surrounding said at least one user input event; and
(f) generating a diagnostic frame comprising said image, and text representing attributes of said at least one user input event.

17. The machine-readable storage of claim 16, further comprising:
repeating said steps (a)–(f) for subsequent ones of said user input events to build a plurality of diagnostic frames.

18. The machine-readable storage of claim 17, further comprising: diagnosing an application fault according to said plurality of diagnostic frames.

19. The machine-readable storage of claim 17, wherein said steps (a)–(f) are responsive to a detection of an application fault.

20. The machine-readable storage of claim 17, further comprising:
storing said diagnostic frames in a data repository, wherein subsequent ones of said diagnostic frames overwrite earlier ones of said diagnostic frames, said plurality of diagnostic frames representing recent user interactions with an application.

21. The machine-readable storage of claim 16, further comprising:
providing said intercepted user input event to an intended application.

22. The machine-readable storage of claim 16, wherein said at least one user event comprises a plurality of user events, one user event being a pointer event, said machine-readable storage further comprising:
identifying a location of said pointer event; and
including a representation of said location of said pointer event in said captured image.

23. The machine-readable storage of claim 22, further comprising:
detecting at least one display object in contact with said region;
identifying attributes of said display object; and
including text representing said display object attributes in said diagnostic frame.

24. The machine-readable storage of claim 23, further comprising:
identifying a type of said display object; and
implementing a data collection technique according to said identified display object type.

25. The machine-readable storage of claim 16, further comprising:
intercepting keystroke events; and
including text representing said keystroke events in said diagnostic frame.

26. A machine-readable storage, having stored thereon a computer program having a plurality of code sections executable by a machine for causing the machine to perform the steps of:
intercepting a pointer event;
processing said pointer event prior to execution of at least one programmatic action by an intended application in response to said pointer event, said processing being based at least in part on said pointer event;
generating and recording diagnostic information based on the processing of said pointer event;
forwarding said pointer event to said intended application;
identifying a location of said pointer event;
capturing an image of a region surrounding said pointer event that includes a representation of said location;
detecting at least one display object in contact with said region; identifying attributes of said display object; and
generating a diagnostic frame comprising said image, and text representing attributes of said pointer event, wherein said attributes include identified attributes of said display object, and wherein said attributes are selected from the group consisting of a name of said display object, a name of a parent of said display object, a coordinate of said location of said pointer event, and a message of said display object.

27. The machine-readable storage of claim 26, wherein said pointer event occurs over said display object.

28. The machine-readable storage of claim 26, wherein said display object is a window.

29. A method of constructing a diagnostic scenario comprising:
intercepting at least one user input event;
processing said at least one user input event prior to excecution of said at least one programmatic action, said processing being based at least in part on said at least one user input event;
generating and recording diagnostic information based on the at least one user input event in response to interception of said at least one user input event;
forwarding said at least one user input event to an intended application;
capturing an image of a region surrounding said user input event, said image including at least one display object in contact with said region; and
generating a diagnostic frame comprising said image, and text representing attributes of said intercepted user input event, wherein said attributes are selected from the group consisting of a name of said display object, a name of a parent of said display object, a message of said display object, and a coordinate of a location associated with said user input event.

* * * * *